United States Patent
Camlica

(10) Patent No.: US 12,377,963 B2
(45) Date of Patent: Aug. 5, 2025

(54) CONTROL SURFACE SYSTEM WITH ACTUATOR MADE OF ELECTROACTIVE MATERIAL

(71) Applicant: TUSAS-TURK HAVACILIK VE UZAY SANAYII ANONIM SIRKETI, Ankara (TR)

(72) Inventor: Fahri Bugra Camlica, Ankara (TR)

(73) Assignee: TUSAS-TURK HAVACILIK VE UZAY SANAYII ANONIM SIRKETI, Ankara (TR)

(*) Notice: Subject to any disclaimer, the term of this patent is extended or adjusted under 35 U.S.C. 154(b) by 221 days.

(21) Appl. No.: 18/016,375

(22) PCT Filed: Apr. 15, 2021

(86) PCT No.: PCT/TR2021/050356
§ 371 (c)(1),
(2) Date: Jan. 16, 2023

(87) PCT Pub. No.: WO2022/019854
PCT Pub. Date: Jan. 27, 2022

(65) Prior Publication Data
US 2023/0271697 A1    Aug. 31, 2023

(30) Foreign Application Priority Data
Jul. 23, 2020  (TR) ................ 2020/11716

(51) Int. Cl.
*B64C 13/50* (2006.01)
*B64C 9/02* (2006.01)
*F03G 7/00* (2006.01)

(52) U.S. Cl.
CPC ............ *B64C 13/50* (2013.01); *B64C 9/02* (2013.01); *F03G 7/0121* (2021.08)

(58) Field of Classification Search
CPC .. B64C 13/50; B64C 9/02; B64C 3/48; B64C 2003/445; F03G 7/0121; B25J 9/1095
See application file for complete search history.

(56) References Cited

U.S. PATENT DOCUMENTS 6,799,739 B1    10/2004  Jones
8,726,652 B1    5/2014   Gunter
(Continued)

FOREIGN PATENT DOCUMENTS

EP    2233735 A2    9/2010
EP    2770200 A2    8/2014
(Continued)

OTHER PUBLICATIONS

International Search Report and Written Opinion for PCT application No. PCT/TR2021/050356, mailed Jul. 6, 2021.
(Continued)

*Primary Examiner* — Arfan Y. Sinaki
(74) *Attorney, Agent, or Firm* — NOTARO, MICHALOS & ZACCARIA P.C.

(57) ABSTRACT

A control surface system for a body located in an air and/or space vehicle. The control surface system having at least one control surface which is located on the body and which, by moving relatively to the body, enables air flow to be controlled and the air vehicle to maneuver accordingly. The control surface system having at least one actuator which is made of an electroactive polymer material which is located on the body and which changes its form depending on electrical energy and based thereon, triggers the control surface.

11 Claims, 2 Drawing Sheets

(56) References Cited

U.S. PATENT DOCUMENTS

| | | | |
|---|---|---|---|
| 9,643,716 B2 | 5/2017 | Sheahan, Jr. et al. | |
| 2009/0256025 A1* | 10/2009 | Verde Preckler | B64C 5/18 89/1.14 |
| 2010/0247314 A1* | 9/2010 | Narasimalu | F03D 7/0232 416/146 R |
| 2015/0251747 A1* | 9/2015 | Roe | B64C 3/54 29/592 |
| 2018/0023618 A1* | 1/2018 | Galeotti | F16C 11/12 244/214 |
| 2020/0350803 A1 | 11/2020 | Morisaki et al. | |

FOREIGN PATENT DOCUMENTS

| | | |
|---|---|---|
| EP | 2851287 A1 | 3/2015 |
| EP | 3444183 A1 | 2/2019 |
| GB | 2450793 A | 1/2009 |
| WO | 2019/189342 A1 | 10/2019 |

OTHER PUBLICATIONS

International Preliminary Report on Patentability, completed Oct. 19, 2022.
Demand/Request for Preliminary Examination dated May 20, 2022.
International Application Status Report generated Jan. 3, 2023.
Written Opinion of International Preliminary Examining Authority mailed Jul. 26, 2022.
Response to Written Opinion of International Preliminary Examining Authority dated Sep. 23, 2022.

* cited by examiner

CONTROL SURFACE SYSTEM WITH ACTUATOR MADE OF ELECTROACTIVE MATERIAL

FIELD

This invention relates to systems that move the control surfaces which enable maneuvering to be performed in air and/or space vehicles.

BACKGROUND

During the movement of an air and/or space vehicle, the necessary orientations to reach the target location are made by the control surfaces (elevator, rudder, aileron, flap, spoiler, etc.). Although the number and type of control surfaces in question vary depending on the air and/or space vehicle, they are generally divided into two classes as primary control surfaces and secondary control surfaces. While primary control surfaces enable an air and/or space vehicle to perform various maneuvers such as roll, pitch and yaw movements, secondary control surfaces generate an effect on lift and drag forces during flight by actuating the high-lift mechanisms.

The movement of control surfaces in an air and/or space vehicle is carried out by a flight control system operating in dependence on the location commands given by the flight crew or autopilot software. In general practice, actuators are used to drive the control surfaces and actuators are driven by a central drive unit and various mechanical transmission elements connected thereto.

Dielectric Elastomer Actuators (DEA), one type of actuators that can be used to actuate the control surfaces in an air and/or space vehicle, work based on the principle of converting electrical energy into mechanical energy. Theoretically, dielectric elastomer actuators, which can convert electrical energy into mechanical energy at a very high efficiency, have been preferred recently due to their lightness, flexibility, low energy requirement and low production costs. When these actuators are produced in the form of a strip/circle/square/rectangle etc., a movement output can be obtained by making use of their ability to make an extension or retraction motion on a predetermined axis as they are triggered with electrical energy.

The United States patent document U.S. Pat. No. 6,799,739, which is included in the known state of the art, discloses a control surface drive system composed of two lines that enable the triggering of actuators. It is mentioned that these two lines are connected to a source containing hydraulic fluid and the control surfaces are controlled by triggering the hydraulic actuators with the fluid taken therefrom.

The United States patent document U.S. Pat. No. 9,643,716, which is included in the known state of the art, discloses an actuator mechanism located between a main stationary surface in an aircraft and a movable surface performing relative motion relative to that stationary surface. It is described that the actuator is triggered by a hydraulic or electromechanical system to control the moving surface and to enable it to perform translation, sweeping or rotation movements.

SUMMARY

The control surface system developed by the present invention enables the actuation of control surfaces in air and/or space vehicles to be carried out in a more practical, efficient and reliable manner.

Another object of the present invention is to realize the actuation of control surfaces in air and/or space vehicles using a more lightweight system.

A further object of the present invention is to realize a control surface system in which the actuator can be mounted detachably.

The control surface system realized to achieve the object of the invention and defined in the first claim and the other claims dependent thereon comprises an actuator, which enables the control surfaces, provided on the body in connection to the actuator, to move relatively to the body as a result of moving the actuator under electrical stimulation according to the orientations made by a user and/or controller in order to provide the required orientation for obtaining a desired position for the air and/or space vehicle.

The control surface system of the invention comprises a holder to which the actuator is placed in a detachable manner and which tightly grips the actuator to prevent it from leaving the holder when it changes its length once it is stimulated, and allows the actuator to perform an extension-retraction motion. The actuator is mounted between the body and the control surface by means of the holder. A coupling assembly, in turn, enables the holder to be connected to the body and the control surface, thereby enabling the control surface to move with the deformation, or changing-shape of the actuator. When electrical energy is supplied to the actuator, a linear extension occurs in the actuator structure on the axis where the motion output is obtained, thus the control surfaces triggered by the actuator perform a relative rotational movement with respect to the body.

In an embodiment of the invention, the control surface system comprises an actuator that is produced from a dielectric elastomeric material. When the actuator is triggered by electrical energy, it undergoes a partial narrowing deformation on an axis that is perpendicular to the axis where the extension deformation output is obtained so as to convert the electrical energy into mechanical energy and to enable the control surfaces to move with the mechanical output obtained.

In an embodiment of the invention, the control surface system comprises coupling assemblies in such a way that one of the two opposite edges of the actuator contacts a holder which is coupled to the body and the other edge contacts a holder which is coupled to the control surface. Thus, a motion transmission is enabled to take place between the body and the control surface. The coupling assembly is positioned so that one end thereof is in contact with the holder and the other end thereof is in contact with the body and/or the control surface to provide the connection of the holders, to which the mutual ends of the actuator is placed, to the body and/or the control surface. The coupling assembly transmits the linear motion taking place in the actuator, transforming it into a relative motion on the control surface with respect to the body.

In an embodiment of the invention, the control surface system comprises a coupling assembly, which transmits the extension motion of the actuator once the latter is stimulated to the control surfaces, and which has rotational freedom in such a way that a rotational motion is achieved on the control surfaces. By means of a connector, it is enabled to convert the linear motion taking place by the activator's deformation into a radial motion.

In an embodiment of the invention, the control surface system comprises a C-shaped housing located on the holder and allowing the actuator to be easily placed to and removed from the holder, thereby allowing the actuator to be positioned between the holders so as to remain between the body and the control surface.

In an embodiment of the invention, the control surface system comprises a housing located in and/or on the holder, allowing the actuator to be slidably mounted to and removed from the holder, and limiting the movement of the actuator in the housing when it is closed after the actuator is mounted. In this way, when the actuator is placed with its edges contacting the housing, they can be easily mounted and removed, and maintenance and/or replacement can be easily provided. While the air and/or space vehicle is in motion, it is aimed to prevent the actuators from moving in the housing and/or leaving the housing.

In an embodiment of the invention, the control surface system comprises a housing with a snap-fit structure so as to enable the prevention of the actuators' movement in the housing and/or out of the housing when the actuator is geometrically locked after it is fully fitted into to the housing. This snap-fit connection may be realized such that a recess or protrusion provided at the edge of the actuator fit to a respective complementary protrusion or recess provided in the housing. Once a complete fitting is achieved, the geometrically-locked actuator is prevented from leaving the housing without user intervention. By producing the housing with an inclined structure, it can be ensured that the actuator does not leave the housing under motion.

In an embodiment of the invention, the control surface system comprises a border at the edges of the actuator in order to hold together the elastomeric layers in the structure of the actuator and/or to prevent the edge of the actuator from becoming deformed when it is fitted to and removed from the holder. The borders can be manufactured from a different material or from the elastomeric material contained in the actuator to increase the abrasion resistance on the opposite edges of the actuator. The border structures can be produced so as to provide a form-fit connection with the holder in the areas where they contact the holder.

In an embodiment of the invention, the control surface system comprises a housing with a geometric structure that is shapely matched to the border to be able to fit to the borders on the actuator to provide a tight fit connection. When the actuator is slid in one direction and fully inserted into the housing, a complementary form is created so that there is almost no gap between the housing and the border, thus ensuring that the borders are tightly supported in the housing.

In an embodiment of the invention, the control surface system comprises one or more elastomeric layers that can be produced in various geometric shapes, as well as electrodes that are conductive on the upper and lower surfaces of these layers and that can be deformed in line with the deformation of the actuator. With a potential applied to the electrodes, positive and negative electrodes causes an electric field to be generated and make the actuator, which has a dielectric structure, compress between the electrodes, thereby enabling the axial deformation of the actuator which take place in the form of extension and retraction.

In an embodiment of the invention, the control surface system comprises a duct-shaped hole formed on the holder to enable the assembly of a conductor, which provides the electrical connections (cable, etc.) necessary for the transmission of electrical energy to be used to drive the actuator, to be carried out so that the electrical connections is not damaged. With the hole produced on the holder, the conductor can be easily connected to the actuator and by virtue of the position and structure of the hole, the conductor is prevented from becoming damaged when the actuator moves.

In an embodiment of the invention, the control surface system comprises a body in the form of a wing, vertical stabilizer, horizontal stabilizer, or an airframe. The control surfaces are provided on the body and perform a relative motion with respect to the body when triggered by the actuator.

In an embodiment of the invention, the control surface system comprises at least one control unit that provides the actuators with the necessary electrical energy according to the commands given by a user or a flight control software and determines the amount of energy supplied to the electrodes according to the desired position of the control surface.

BRIEF DESCRIPTION OF THE DRAWINGS

The control surface system realized to achieve the object of the present invention is shown in the attached figures, wherein from these figures.

DETAILED DESCRIPTION

Figure 1:
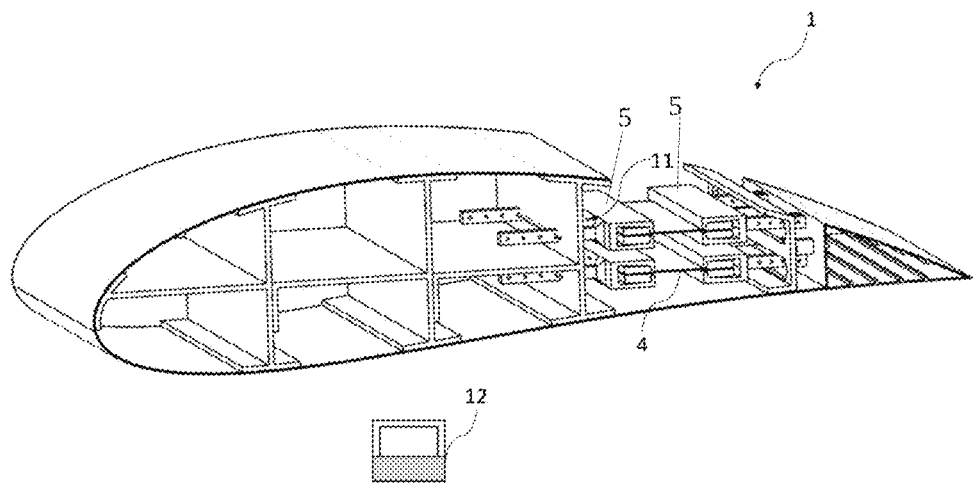
FIG. 1—is a partial perspective view of a control surface system.

All the parts illustrated in figures are individually assigned a reference numeral and the corresponding terms of these numbers are listed below.
1. Control surface system
2. Body
3. Control surface
4. Actuator
5. Holder
6. Coupling assembly
7. Housing
8. Opening
9. Cover
10. Border
11. Hole
12. Control unit The control surface system (1) comprises a body (2) located in an air and/or space vehicle, at least one control surface (3) which is located on the body (2) and which by moving relatively to the body (2), enables air flow to be controlled and the air vehicle to be maneuvered accordingly, at least one actuator (4) which is made of an electroactive polymer material, is located on the body (2) and which changes its form depending on electrical energy and thanks to this, triggers the control surface (3) (FIG. 1).

Figure 2:
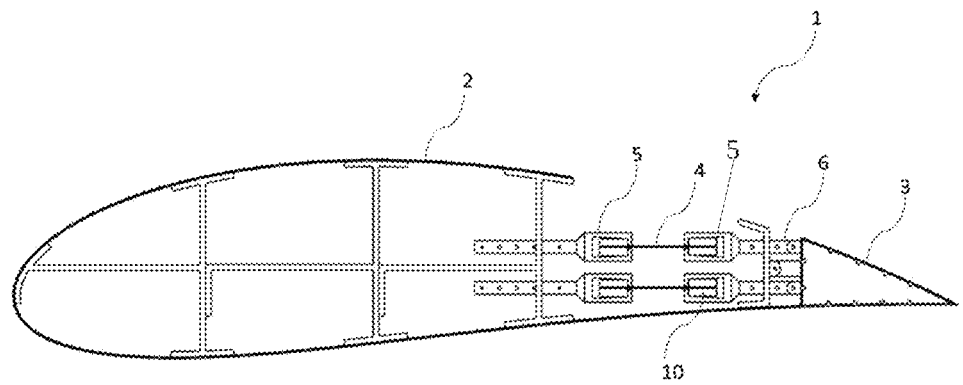
FIG. 2—is a side view of a control surface system.

The control surface system (1) of the invention comprises at least two holders (5), one of which is connected to the body (2) and the other to the control surface (3) so that the actuator (4) is attached there between in detachable manner, and which mutually holds the actuator (4) at least partially on both of its sides; and at least one control surface (3) which moves by being triggered once the actuator (4) changes its form (FIG. 2).

The control surfaces (3), which are located so as to be in connection with a body (2) that can be a wing, vertical stabilizer, horizontal stabilizer or airframe of the air and/or space vehicle, are moved by the deformation effect received from the actuator (4) and enable the orientation of the air and/or space vehicle. The actuator (4) is made of an electroactive polymer material; thanks to this, when electrical energy is supplied to the electrodes in its structure, it extends and makes a linear motion so as to enable the control surface (3), which can be a fin, aileron, flap, rudder, slat, elevator, to move. The actuator (4), which is triggered by electrical energy, performs a deformation motion such that once the actuator (4) is deformed, the holders (5) located at the edges of the actuator (4) are enabled to move. The actuator (4) changes its shape depending on the amount of electrical energy supplied thereto, and the control surface (3) triggered by this deformation can take different positions. The actuator (4) not energized by electrical energy returns to its initial form as it was mounted between the holders (5), and thanks to this, the control surface (3) assumes again its initial position when the electrical energy supplied to the actuator (4) is cut off.

The holders (5) enable the actuator (4) to be supported from two of its different edges and to be mounted to the body (2) and/or to the control surface (3). The holders (5) move as a whole with the actuator (4), enabling the deformation motion of the actuator (4) to be transmitted and the control surface (3) to be triggered. The holder (5) completely surrounds the actuator (4) so as to include an opening (8), giving the actuator (4) freedom of movement in the direction of extension and/or retraction, and thanks to this, the actuator (4) is prevented from leaving the holder (5) during its operation. The actuator (4) is positioned between the holders (5) and may slide in and out of the holders (5) in a predetermined mounting direction, thereby providing ease of mounting for replacement and/or maintenance operations. The holder (5) is produced in an angular structure according to the movement of the actuator (4) during operation.

In an embodiment of the invention, the control surface system (1) comprises an actuator (4) that is produced from a dielectric elastomeric material, and thanks to this, changes its shape with the voltage applied to it. Electrical energy is converted into mechanical energy by means of deformation taking place in the actuator (4) as it is triggered by applying electrical energy thereto.

In an embodiment of the invention, the control surface system (1) comprises more than one coupling assembly (6) at least one of which is connected to the body (2) and at least another one of which is connected to the control surface (3) on the holder (5), and which transmits the movement it receives from the holder (5) to the control surface (3) so as to enable the control surface (3) to perform a relative motion with respect to the body (2). The deformation motion of the triggered actuator (4) directly affects the holder (5) and is transmitted to the control surface (3) by means of the coupling assembly (6). The coupling assembly (6) located between the control surface (3) and the holder (5) has a structure that allows the actuator (4) to perform a relative rotational motion with respect to the body (2). In order to ensure that the actuator (4) stays between the body (2) and the control device, the coupling assembly (6) enables the holders (5) to be mounted on the body (2) and the motion of the actuator (4) to be transmitted to the control surface (3). The connector assembly (6) is located such as to contact with one of its ends at least one holder (5) placed so as to be in connection with the body (2), and to contact with its mutual end at least another holder (5) placed so as to be in connection with the control surface (3).

In an embodiment of the invention, the control surface system (1) comprises a coupling assembly (6) which is located on the holder (5) and enables the linear motion taking place when the actuator (4) changes its shape to be transformed into a circular motion on the control surface (3). The coupling assembly (6) located between the holder (5) and the control surface (3) comprises a rotary joint that enables the rotation of control surface (3) triggered by the action of the actuator (4). Once the actuator (4) is mounted between the holders (5), it becomes located between two parts, one of which is a movable control surface (3) and the other a fixed body (2) according to the air and/or space vehicle's movement during flight, so that the control surface (3) triggered by the extension of the actuator (4) performs a rotational motion around the axis to which it is connected to the body (2).

In an embodiment of the invention, the control surface system (1) comprises a holder (5) containing at least one C-shaped housing (7) in which the actuator (4) is slidably mounted. The housing (7) located in the interior of the holder (5) where it contacts the actuator (4) enables to detachably connect the actuator (4) to the holder (5). Thus, operations such as maintenance, repair and replacement of the actuator (4) are carried out easily by a user. Thanks to its C-shape, the slot (7) gives the actuator (4) freedom to move in the direction of extension.

Figure 3:
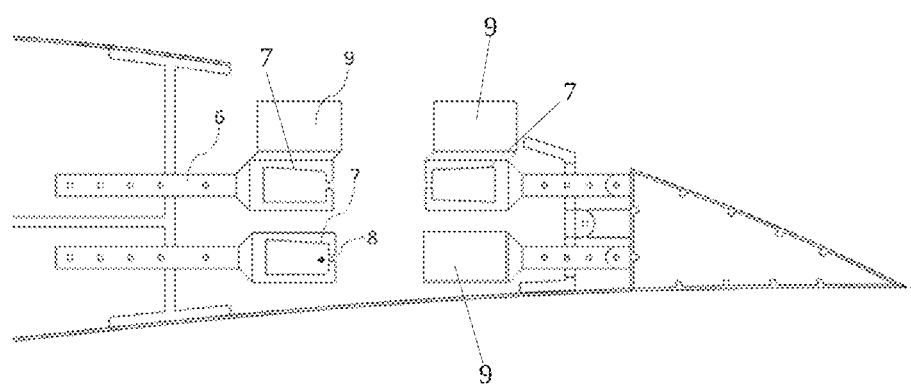
FIG. 3—is a cross-sectional view of a control surface system.

In an embodiment of the invention, the control surface system (1) comprises at least one opening (8) located on the holder (5) to enable the actuator (4) to slide into and be placed in the housing (7) and at least one cover (9) located on both sides of the opening (8) to at least partially close the direction in which the actuator (4) is positioned in the housing (7), thereby almost completely preventing the actuator (4) from sliding out of the housing (7) when it is brought to a closed position. After the actuator (4) is slidably placed in the slot (7) in one direction, the cover (9) is closed and the movement of the actuator (4) in the mounting direction is almost completely restricted. The cover (9) is located at the point where the edge of the actuator (4) slidably placed in the housing (7) first contacts the housing (7) and it is closed after the actuator (4) is completely placed in the housing (7), thereby preventing the actuator from leaving the housing (7) when it changes its shape as a result of energizing the actuator (4). The cover (9) may be fastened to the holder (5) detachably or slidably. (FIG. 3).

In an embodiment of the invention, the control surface system (1) comprises a housing (7) that allows the actuator (4) placed therein to be connected in a snap-fitting manner, thereby obtaining an interference fit connection between the actuator (4) and the holder (5). Snap-fitting is ensured by interlocking a protrusion or recess in the housing (7) to a respective complementary recess or protrusion on the actuator (4) such as to enable the actuator (4) to become locked after it has been fully slidably inserted into the housing (7), thereby almost completely preventing the actuator (4) from leaving the slot (7) during operation.

In an embodiment of the invention, the control surface system (1) comprises more than one border (10) provided mutually on the actuator (4) and enabling the actuator (4) to be detachably mounted to the holder (5). The border (10) allows the elastomeric layers and electrodes in the actuator (4) to be held together. The border (10) which is located on the actuator (4) such that it contacts the holder (5) is made of a material of high strength so as to protect the border (10) of the actuator (4) at least partially against abrasion when it is inserted and removed. The border (10) enables the electrical connections used to transmit the energy required to trigger the actuator (4) to be realized and allows the conductors to be at least partially protected.

In an embodiment of the invention, the control surface system (1) comprises a housing (7) that is form-fitting with the border (10), allowing the actuator (4) to be supported by gripping the borders (10) slidably placed therein. The housing (7) is produced in a complementary geometry with the border (10), allowing a tight-fit connection to be obtained, and thanks to the form-fit, the actuator (4) is almost completely prevented from leaving the slot (7) during operation.

In an embodiment of the present invention, the control surface system (1) comprises at least two electrodes (E) providing the energizing of the actuator (4) and the actuator (4) composed of one or more dielectric elastomeric layers in the form of a rectangle, circle or ellipse between the electrodes. On the upper and lower surfaces of the actuator (4) are located electrodes which are conductive and can be deformed in line with the deformation of the actuator (4). The electrodes can usually be in powder/liquid form or in the form of a thin metal film. With a potential applied to the electrodes, positive and negative electrodes cause an electric field to be generated and enable the actuator (4) with a dielectric structure to compress between the electrodes, thereby enabling it to realize axial deformation in the form of extension and retraction.

In an embodiment of the invention, the control surface system (1) comprises a hole (11) on the holder (5), enabling the conductor that provides the transmission of electrical energy used to trigger the actuator (4) to be protected and to be mounted onto the actuator (4). Thanks to the hole (11) in the form of a duct to allow the electrical connection cables to be passed there through, the conductors are almost completely prevented from jamming during the movement of the actuator (4) and control surface (3). Thanks to the hole (11), the cables in the air and/or space vehicle are prevented from being abraded and/or damaged under external factors by direct contact with air.

In an embodiment of the invention, the control surface system (1) comprises a body (2) which is a wing, vertical stabilizer, horizontal stabilizer, or an airframe. In air and/or space vehicles, the control surface (3) structures are located on the body (2) in an assembled form and once they are moved, they enable the necessary maneuvering to be carried out by directing the air flow on the outer surface of the air and/or space vehicles by changing the external (lift, drag, etc.) forces acting on the air and/or space vehicle.

In an embodiment of the invention, the control surface system (1) comprises a control unit (12) that enables the actuators (4) to be triggered according to the commands given by the flight crew or autopilot software. The control unit (12) enables the electrical signal to be transmitted to the actuator (4), which enables the air vehicle to perform the relevant maneuvering according to the commands received from the pilot and/or processor. The control unit (12) also performs the processes of determining the potential difference value to be generated between the electrodes according to the commands it receives and adjusting the electrical energy to be supplied to provide this value.

The invention claimed is:

1. A control surface system (1) configured for an air or space vehicle comprising a body (2), the control surface system (1) comprising:
   at least one control surface (3) which is configured for being located on the body (2) and which, by moving relative to the body (2), enables air flow to be controlled and the air or space vehicle to maneuver accordingly;
   at least one actuator (4) having sides and which is made of an electroactive polymer material, which is configured for being located on the body (2) and which changes form depending on electrical energy and based thereon, triggers the control surface (3) which moves by being triggered once the actuator (4) changes form;
   two holders (5), a first holder (5) configured for being connected to the body (2) and a second holder (5) configured for being connected to the control surface (3) so that the actuator (4) is mounted between the first holder and the second holder in a detachable manner; and
   at least one C-shaped housing (7), wherein the actuator (4) is slidably mounted in the at least one C-shaped housing (7) and wherein the at least one C-shaped housing (7) mutually holds the actuator (4) at least partially from both sides of the actuator (4).

2. The control surface system (1) according to claim 1, wherein the actuator (4) is produced from a dielectric elastomeric material and based thereon, changes shape when a voltage is applied thereto.

3. The control surface system (1) according to claim 1, further comprising more than one coupling assembly (6), wherein a first one of the more than one coupling assembly (6) is connected to the body (2) and wherein a second one of the more than one coupling assembly (6) is connected to the control surface (3), and which each transmits movement received from the respective holder (5) to the control surface (3) so as to enable the control surface (3) to perform a motion with respect to the body (2).

4. The control surface system (1) according to claim 3, wherein each coupling assembly (6) is located on a respective one of the first holder (5) and the second holder (5), and enables the motion taking place when the actuator (4) changes shape to transform into a circular motion on the control surface (3).

5. The control surface system (1) according to claim 1, further comprising:
   at least one opening (8) located on each of the two holders (5) to enable the actuator (4) to be slidably placed in the housing (7); and
   at least one cover (9) located on at least one side of each opening (8) to at least partially close a direction in which the actuator (4) is placed in the housing (7), thereby preventing the actuator (4) from sliding out of the housing (7) when the cover (9) is brought to a closed position.

6. The control surface system (1) according to claim 1, further comprising a border (10) provided on the actuator (4) and enabling the actuator (4) to be detachably mounted to the two holders (5).

7. The control surface system (1) according to claim 6, wherein the housing (7) is form-fitting with the border (10), enabling the actuator (4) to be supported by the housing and gripping the border (10) slidably placed therein.

8. The control surface system (1) according to claim 1, further comprising a hole (11) on one of the two holders (5) for protected access to the actuator (4).

9. The control surface system (1) according to claim 1, wherein the body (2) is a wing, vertical stabilizer, horizontal stabilizer or an airframe.

10. The control surface system (1) according to claim 1, further comprising at least one control unit (12) that enables the actuator (4) to be triggered according to commands received from the flight crew or an autopilot software.

11. A control surface system (1) configured for an air or space vehicle comprising a body (2), the control surface system (1) comprising:
   at least one control surface (3) which is configured for being located on the body (2) and which, by moving relative to the body (2), enables air flow to be controlled and the air or space vehicle to maneuver accordingly;

at least one actuator (4) which is made of an electroactive polymer material, which is configured for being located on the body (2) and which changes form depending on electrical energy and based thereon, triggers the control surface (3) which moves by being triggered once the actuator (4) changes form;

two holders (5), a first holder (5) configured for being connected to the body (2) and a second holder (5) configured for being connected to the control surface (3) so that the actuator (4) is mounted between the first holder and the second holder in a detachable manner; and at least one C-shaped housing (7), wherein the actuator (4) is mounted in the at least one C-shaped housing (7) via an interference fit connection between the actuator (4) and the two holders (5) in a snap-fitting manner, and wherein the at least one C-shaped housing (7) mutually holds the actuator (4) at least partially from both of sides of the actuator (4).

\* \* \* \* \*